United States Patent
Do et al.

(10) Patent No.: US 6,987,792 B2
(45) Date of Patent: Jan. 17, 2006

(54) PLASMA PYROLYSIS, GASIFICATION AND VITRIFICATION OF ORGANIC MATERIAL

(75) Inventors: Robert T. Do, Potomac, MD (US); Gary L. Leatherman, Frederick, MD (US)

(73) Assignee: Solena Group, Inc., Washington, DC (US)

( * ) Notice: Subject to any disclaimer, the term of this patent is extended or adjusted under 35 U.S.C. 154(b) by 0 days.

(21) Appl. No.: 10/482,573

(22) PCT Filed: Aug. 22, 2001

(86) PCT No.: PCT/US01/26076

§ 371 (c)(1),
(2), (4) Date: Dec. 29, 2003

(87) PCT Pub. No.: WO03/018721

PCT Pub. Date: Mar. 6, 2003

(65) Prior Publication Data

US 2004/0170210 A1 Sep. 2, 2004

(51) Int. Cl.
*H05B 1/00* (2006.01)
*B01J 19/08* (2006.01)

(52) U.S. Cl. ............... 373/18; 219/121.36; 110/346
(58) Field of Classification Search ............ 373/18–25, 373/8, 79; 219/121.36, 121.37, 121.38, 121.51, 219/121.52, 121.59; 110/165 R, 345, 346–347, 110/250; 422/186.23; 75/10.22, 499, 10.38
See application file for complete search history.

(56) References Cited

U.S. PATENT DOCUMENTS

| | | | |
|---|---|---|---|
| 3,518,062 A | | 6/1970 | Delange et al. |
| 4,019,895 A | * | 4/1977 | Santen .................. 75/10.22 |
| 4,102,766 A | * | 7/1978 | Fey ........................ 373/18 |
| 4,115,074 A | | 9/1978 | Yoshida et al. |
| 4,466,807 A | | 8/1984 | Santen et al. |
| 4,508,040 A | * | 4/1985 | Santen et al. ............ 110/347 |
| 4,591,428 A | | 5/1986 | Pronk |
| 4,831,944 A | | 5/1989 | Durand et al. |
| 5,046,144 A | * | 9/1991 | Jensen ................. 219/121.36 |
| 5,107,517 A | * | 4/1992 | Lauren ..................... 373/18 |
| 5,493,578 A | * | 2/1996 | Fukusaki et al. ........... 373/18 |
| 5,544,597 A | | 8/1996 | Camacho |
| 5,634,414 A | | 6/1997 | Camacho |
| 5,798,496 A | | 8/1998 | Eckhoff et al. |
| 5,958,264 A | * | 9/1999 | Tsantrizos et al. ..... 219/121.38 |

FOREIGN PATENT DOCUMENTS

| | | |
|---|---|---|
| EP | 0837041 A | 4/1998 |
| KR | 99074869 A | 10/1999 |

* cited by examiner

*Primary Examiner*—Tu Hoang
(74) *Attorney, Agent, or Firm*—Hunton & Williams LLP

(57) ABSTRACT

Blocks of organic material (58) are fed from a plurality of directions into a reactor (10) having three zones (16, 18, 19). The material forms a bed (70) atop a bed of consumable carbon catalyst (60). These beds are heated by a series of plasma arc torches (42) mounted in inlets (37) about the reactor. Gas is supplied via inlets (39, 41) from wind drums (38, 40). The superheated gas from the reaction is vented through an outlet (30) and is used to produce electrical energy.

12 Claims, 5 Drawing Sheets

PLASMA PYROLYSIS, GASIFICATION AND VITRIFICATION OF ORGANIC MATERIAL

FIELD OF INVENTION

This invention relates to an apparatus and process for ecologically acceptable production of electrical energy from renewable sources of fuel such as waste, including municipal solid waste (MSW), industrial waste (including waste from coal operations such as coal fines), hazardous waste and biomass, by means of gasification and pyrolysis utilizing plasma arc heating technology.

BACKGROUND OF THE INVENTION

As nations become more industrialized and the world more populated, there is a constant increase both in the demand for electricity and in the generation of waste.

Electrical energy today is typically generated by power plants that burn fossil fuels such as coal, natural gas or heavy diesel oil to generate electricity. Such plants, however, also generate significant air pollution. Nuclear power plants produce electricity more cleanly, but they are being phased out worldwide due to popular concern over their perceived risks and the radioactive nature of the waste they generate. In view of the increasing costs and dwindling supply of fossil fuels, many countries are recognizing and encouraging the production of electrical energy from renewable sources of fuel, such as wind, solar, hydro and waste/biomass.

Waste (including MSW, industrial waste, toxic waste, and coal ash and fines) is currently being dumped into polluting landfills or being burned in common incinerators, creating emissions of pollutants, including carcinogenic materials such as semi-volatile organic compounds (SVOCs)—dioxins, furans, etc.—that are products of low temperature combustion.

Landfills are becoming full, and the availability of new sites near heavily populated areas is limited worldwide. Additionally, the continued pollution of ground water by hazardous leachate, as well as health concerns caused by malodor, rodents and fumes, have rendered landfills undesirable. These issues and others have resulted in the development of the NIMBY Syndrome ("not in my backyard") in most populations. For these reasons, the European Union is forcing closure of all landfills by the year 2002 and mandating that existing landfills meet new, more stringent leachate and pollution control standards, thus increasing the costs of landfills markedly.

Incinerators also have been closed down or banned in many countries because of hazardous air emissions and resulting ash production. As a result of the low temperature combustion that takes place in these incinerators, hydrocarbon chains are not completely severed and are released into the atmosphere as SVOCs, which are known carcinogens and are passed through to humans via the food chain, for example, as dioxins that are deposited on grass and eaten by cattle and end up in milk sold to humans. The fixed carbons in the waste also are untouched by the low temperature incineration process and end up as bottom ash and fly ash. This ash makes up almost 25% of the waste and is considered hazardous due to its leachability once land-filled. Many countries are now prohibiting the direct landfill of ash.

There thus exists a need both for a source of readily renewable electrical energy, and for an apparatus and process for dispensing with various forms of waste, that solve the foregoing problems. This need has been met in part by the apparatus and process disclosed and claimed in U.S. Pat. Nos. 5,544,597 and 5,634,414 issued to Camacho and currently assigned to Global Plasma Systems Group, Inc. (the "Camacho Patents"). The Camacho Patents disclose a system in which waste is compacted to remove air and water and delivered in successive quantities to a reactor having a hearth. A plasma torch is then used as a heat source to pyrolyze organic waste components, while inorganic waste components are removed as vitrified slag.

There remain, however, several disadvantages to, or problems not solved by, the apparatus and process disclosed and claimed in the Camacho patents. First, the introduction of waste into the reactor from a single direction can lead to an uneven build-up of material on one side of the reactor, causing channeling and bridging. Channeling is the uneven distribution of gas flow up through the waste bed that in turn creates an uneven heating of the waste bed. This creates pockets of un-gasified waste that decreases the overall efficiency of the process. Bridging is the binding together of portions of the waste bed into a solid mass that blocks the upward flow of gas and the downward flow of waste in that portion of the reactor. This also decreases the efficiency of the process and can increase the degradation of the refractory material lining the reactor. Second, the bottom of the reactor does not always distribute heat evenly throughout the bed of waste introduced in the reactor. Third, the single plasma torch used in the Camacho patents is sometimes not enough to provide sufficient heating. Fourth, it would be desirable to increase the number of gas inlet valves and improve their location to introduce desired gases more efficiently to the reaction. Finally, the apparatus used in the Camacho Patents for compacting waste requires that the waste first be separated from its containers, leading to reduced efficiency and increased cost.

It is therefore the overall object of the present inventors to disclose an improvement of the previously disclosed apparatus and process for the pyrolysis, gasification and vitrification of organic material, such as waste.

It is a further object of this invention to provide an improved material feeding system in order to enhance further the efficiency of the process as well as to increase the flexibility of the system, increase the ease of use of the material handling system, and allow the reactor to receive a more diverse and varied material stream.

It is an additional object of this invention to provide an improved design of the apparatus to enhance the process control of the gasification of the material, allow the gasification process to occur in the reactor, ensure optimum performance, ensure complete breakdown of all hydrocarbon chains fed into the system, decrease wear and tear in the refractory, and decrease torch power consumption and optimize energy performance of the entire process.

It is a further object of this invention to provide an improved method of handling hot exit gas and better preparing it to meet the requirement of a gas turbine prior to feeding it into an integrated combine cycle gas turbine system.

It is also an object of this invention to disclose the plasma pyrolysis, gasification and vitrification (PPGV) process of mixed sources of waste as a safe and efficient method of producing a fuel gas for feeding into a combined cycle gas turbine to produce renewable electrical energy.

Finally, it is an object of this invention to disclose the utilization of the PPGV process of organic material to produce $H_2$ gas as a fuel source for a fuel cell system.

Other objects and advantages will be more fully apparent from the following disclosure and appended claims.

SUMMARY OF THE INVENTION

Mixed sources of waste or other carbonaceous material (such as coal fines), including MSW, industrial and hazardous wastes, and biomass, either in solid or liquid form, and/or a mixture thereof, are combined and fed into a material feeding system which mixes, shreds and compacts the material, including its containers, into a dense compact block of material. This block of material is continuously pushed into a plasma reactor from a plurality of directions, such as through two opposing feed chutes. The feeding of the material is set at a pre-determined rate based on material composition, material bed height and exit gas requirements. The material feeding system serves to homogenize the feeding material and its containers into a block of constant size and composition while removing excess air and water.

The blocks of compacted and shredded material are continuously fed onto the top of a bed of consumable carbon catalyst heated continuously by hot blast air generated and heated by a plurality of plasma torches provided equidistantly around the bottom of the reactor.

The material block forms a bed atop the hot bed of consumable carbon catalyst, creating a counter-current of downward movement of colder material and upward movement of hot gases and carbon particles from the bottom of the reactor.

The organic hydrocarbons in the feed material are gasified and pyrolyzed into a desired and pre-determined exit top gas composition, flow, temperature, calorific content and volume, while the inorganic and non-carbonaceous elements in the feed material, such as metals and ash, are melted by the rising hot gases and flow down as molten liquid through the carbon catalyst bed into a molten liquid (slag) pool at the bottom of the reactor, where it is tapped continuously out of the reactor and cooled into an inert vitrified slag.

At locations along the shaft of the reactor, air, oxygen and/or oxygen-enriched air are introduced into the reactor via inlets in controlled quantities to ensure that the proper gasification/pyrolysis reaction occurs in the reactor to generate the desired exit top gas.

Consumable carbon catalyst and feed material also are introduced at a controlled rate to ensure that the proper gasification/pyrolysis reaction occurs in the reactor and to maintain the desired material bed and carbon-based catalyst bed height. Lime and silicate flux also are introduced into the reactor at controlled quantities through the feed chutes in order to control the vitrification process.

The desired exit top gas consisting essentially of CO and $H_2$ is cooled through a quenching system and scrubbed to remove all acid gases such as $H_2S$, HCl, and any other impurities that might be present. The cleaned and cooled exit gas is then compressed at high pressure into a gas turbine to generate electricity. Hot air from the turbine may be used to produce steam, which may be fed into a steam turbine to produce additional electricity.

DETAILED DESCRIPTION OF THE INVENTION

Details of the invention will now be presented. For ease of reference, this description will discuss the material to be handled by this apparatus and process as waste material, since the use of such material provides the benefits both of producing energy and of eliminating waste in an environmentally friendly manner. However, this apparatus and process can work with any organic material.

Reactor

A typical reactor used in this apparatus and method may be sized to process from 5 to 20 tons per hour of mixed sources of waste, although reactors sized larger or smaller may be used; the exact throughput will depend on the composition of the feed material and the desired overall throughput of the generating plant.

Figure 1:
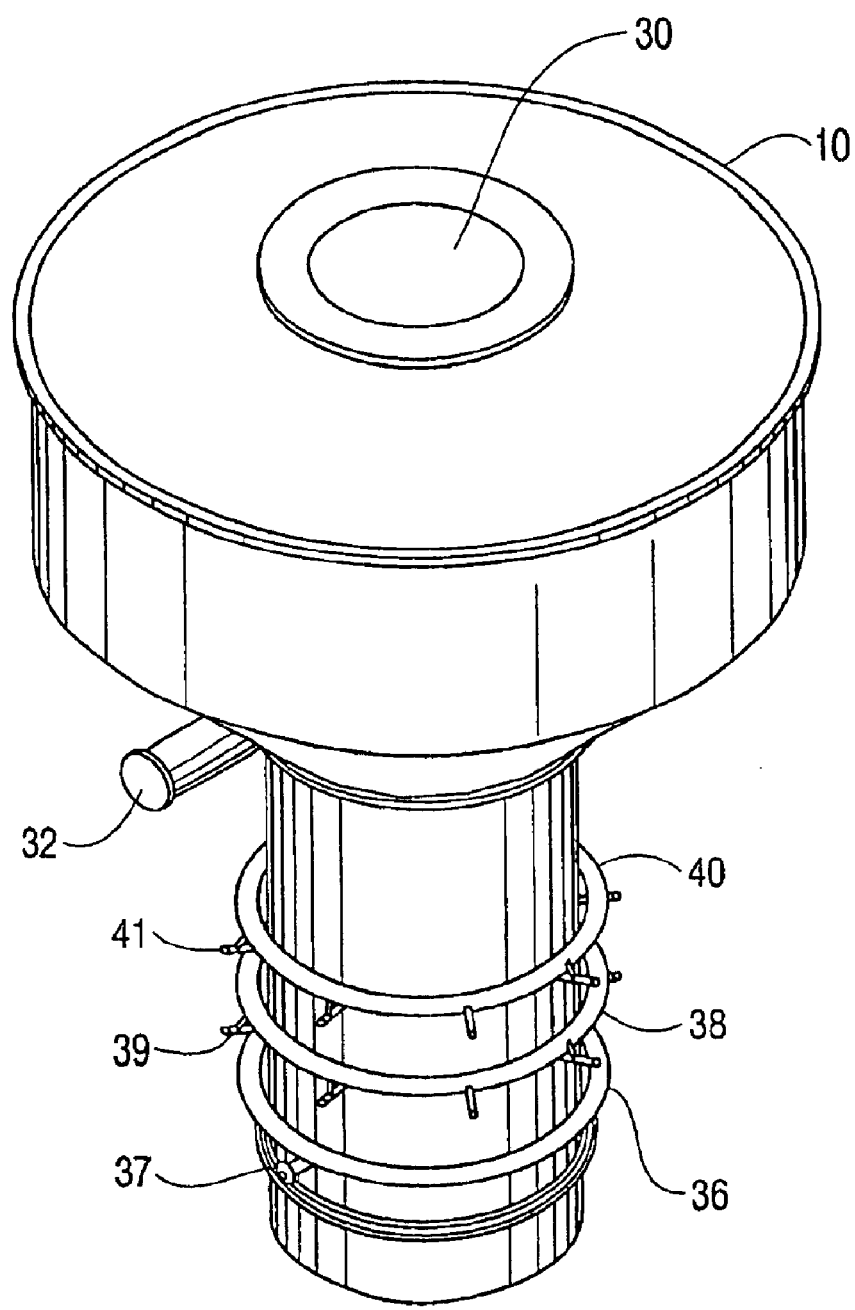
FIG. 1 is a perspective view of a reactor used with an embodiment of the present invention.
Figure 2:
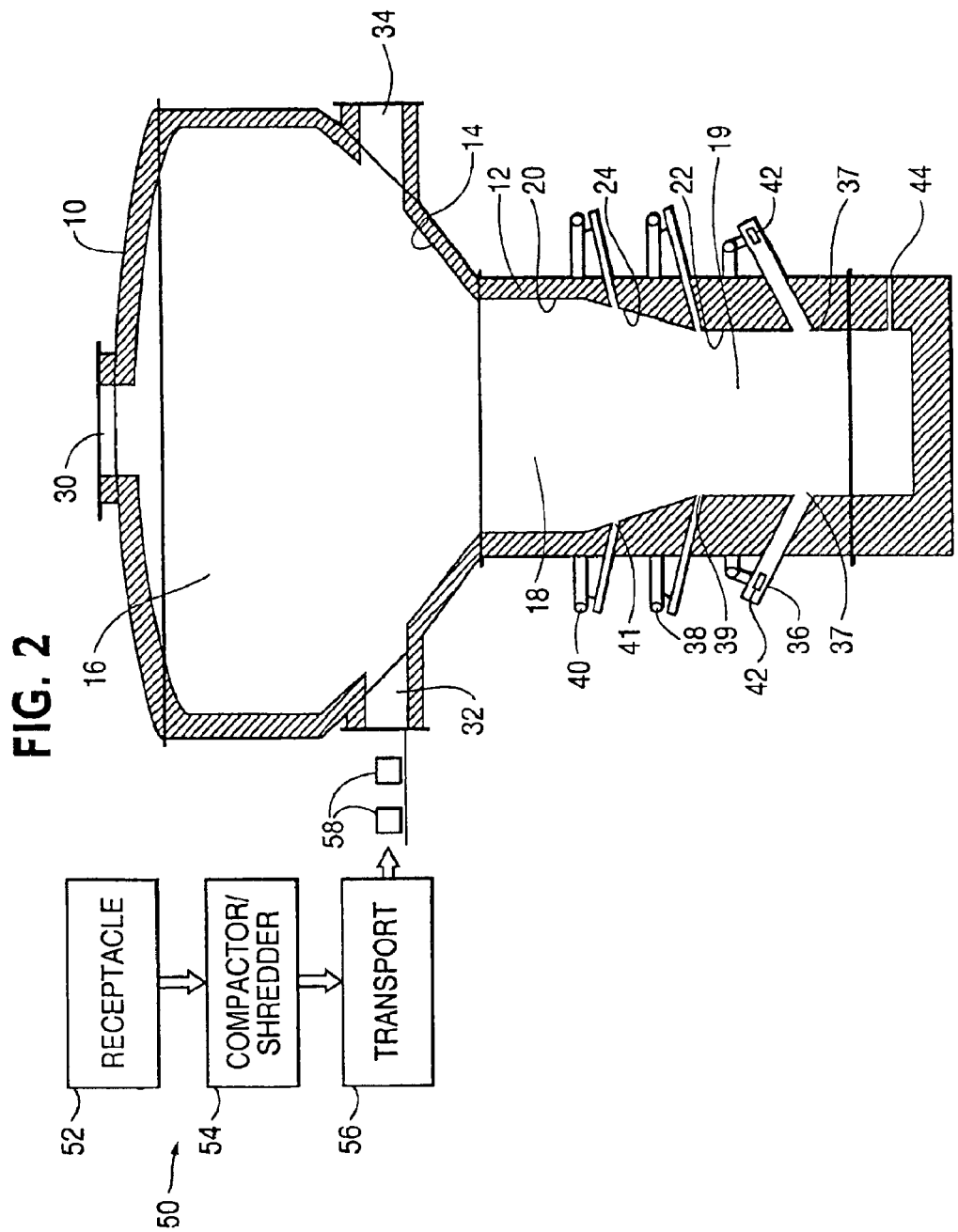
FIG. 2 is a sectional view of the reactor of FIG. 1 shown schematically connected to a material feeding system.

As shown in FIGS. 1 and 2, reactor 10 is constructed preferably of high-grade steel. Depending upon design criteria, the entire vessel may be water-cooled. Alternatively, water-cooling may be used for only the top two thirds of the reactor while the lower third of the reactor is air-cooled. The reactor has a refractory lining 12 throughout its inner shell. Typically, the upper two-thirds of the reactor is lined with three layers of refractory material, with each layer 4 to 6 inches thick. Typically, the lower third of the reactor, which may not be water-cooled, is lined with up to 5 layers of refractory brick for a total thickness of 20 to 30 inches. Depending upon the application other refractory configurations may be used. Both sections utilize typical commercial refractory products, which are known to those in the reactor industry.

The reactor 10 is shaped like a funnel and divided into three sections. The top third of the reactor is referred to as pyrolysis/thermal cracking zone 16. Typically, gas exits the reactor through a single outlet 30 in the center of the top of zone 16. Alternatively, a plurality of exit gas outlets may be provided around the top of zone 16. Zone 16 also contains two opposing feed waste inputs 32 and 34, although a larger number may be provided.

Middle section 18 of the reactor is defined by a side wall 20 having a circumference smaller than that of zone 16 and is encircled by two or more air cylinders or wind drums 38 and 40, respectively. Each wind drum contains air and/or oxygen-enriched air (as pre-determined according to the waste composition), which is introduced into the reactor via equally spaced inlets, or tuyeres, 39 and 41, respectively, around the reactor. The number of gas inlets may typically range from six to ten depending on the size of the reactor and the throughput of the system, although a larger or smaller number may be used. Middle section 18 is also referred to as the gasification zone.

The bottom third of the reactor is vitrification zone 19, which is defined by a side wall 22 having a circumference smaller than that of zone 18. Side walls 20 and 22 are connected by a frustoconical portion 24. Zone 19 houses between 2 to 6 tuyere-like attachments or inlets 37 equally spaced around the circumference of the reactor. In each tuyere-like attachment, which is typically made of water-cooled cooper, is mounted a non-transferred plasma arc torch 42, heat from which is supplied to zone 19 by inlets 37. Gas for the plasma torches 42 is supplied by wind drum 36.

Vitrification zone 19 also houses one or more tap holes 44 where molten slag liquid is tapped continuously into a moving granulating water bath (not shown), where it is cooled and vitrified into an inert slag material suitable for re-use as construction material. (Construction materials with which this slag may be used include tile, roofing granules, and brick.) This bottom section (roughly the bottom third) of the reactor, which contains the molten slag, may, in certain configurations, be attached to the reactor via a flanged fitting to enable rapid replacement of this section in the event of refractory replacement or repairs.

As described in the Camacho Patents, each plasma arc torch 42 is generally supplied with electric power, cooling deionized water and plasma gas through supply conduits from appropriate sources (not shown). The number of torches, the power rating of each torch, the capacity of the waste feeding system, the amount of carbon catalyst, the amount of flux, the size of the reactor, the size and capacity of the syn-gas cleaning system and the size of the combined cycle gas turbine system are all variable to be determined according to the type and volume of waste to be processed by the system.

The reactor will contain throughout its shaft preferably at intervals of three feet or less, sensors (not shown) to detect the pressure and temperature inside the reactor, as well as gas sampling ports and appropriate gas analysis equipment at strategic positions in the reactor to monitor the gasification process. The use of such sensors and gas analysis equipment is well understood in the art.

Waste Feeding System

In the Camacho Patents, a compacting waste delivery system operating through hydraulic cylinders to reduce the waste volume and to remove air and water in the waste prior to feeding into the top of the reactor was described and disclosed.

In order to accommodate waste from multiple and mixed sources such as RDF (refuse-derived fuel), loose MSW, industrial waste, and toxic waste stored in containers such as steel or plastic drums, bags and cans, a more robust feeding system is used than that used in the Camacho Patents. Waste may be taken in its original form and fed directly into the feeding system without sorting and without removing its containers. Waste shredders and compactors capable of such operation are known to those of ordinary skill in the field of materials handling. This step eliminates the need for direct contact of personnel with the waste, promoting safety and public health. Waste feed may be sampled intermittently to determine composition prior to treatment.

All the waste material, including at times its containers, is crushed, shredded, mixed, compacted and pushed into the plasma reactor as a continuous block of waste by the system 50 shown representationally in FIG. 2, comprising a receptacle 52, a shredder/compactor 54, and a transport unit 56. The shredder/compactor 54 will comminute the waste to a preset size to insure optimal performance of the reactor. The feeding rate also is preset to ensure optimum performance of the reactor.

The blocks of waste 58 are delivered into the reactor continuously from multiple locations in zone 16 of the reactor, ensuring even distribution in the reactor until a specific waste bed height is achieved above the consumable carbon catalyst bed. Two blocks of waste 58 may be fed simultaneously into input chutes provided at diametrically opposite sides of reactor 10. More than two chutes may be provided to accept additional blocks. Alternatively, a single chute may be provided if the top of reactor can rotate to accept blocks of waste from a plurality of directions with respect to the bottom of the reactor. Any such arrangement is suitable, so long as it avoids an uneven build-up of waste in any one location in zone 18 of the reactor.

Pressure sensors and temperature sensors along the shaft of the reactor will be used to measure bed height and control the feeding rate of the waste. As a back-up, sight ports may be provided at certain locations to verify activities inside the reactor. All information from the sensors will be fed into a digital control system (DCS) that coordinates the operation of the whole plant performance. As stated in the Camacho Patents, the coordination and monitoring of the feeding system through the use of sensors and a DCS as part of the process control of the reactor are normal protocol and readily apparent to those skilled in the art.

Alternate configurations of the feeding system may be used for different materials. For instance, fine powders or liquid waste may be injected directly into the reactor. Gas transport may be used for fine solids, such as coal fines. Standard pumps may be used for liquids. Such systems are well known to practitioners of material handling.

Operation of the PPGV Reactor

As shown in FIG. 2, the shredded and compacted waste material 58 is fed by the feeding system continuously into reactor 10. For the sake of simplicity, FIG. 2 shows a single material feeding system 50 feeding one of the feeding chutes 32. In order to feed waste into both chutes shown, a second system 50 may be used, or the waste output from the system 50 may be split into two paths to feed both chutes. The continuous feeding from opposite sides of the reactor ensures uniform distribution of the waste feed across the cross section of the reactor. The uniformity of the waste feed distribution as it forms the waste bed 70 shown in FIG. 3 ensures the uniform, upward flow of hot gas from the plasma heat. The carbon-based catalyst bed 60 toward the bottom of the plasma reactor is uniformly distributed across the cross section of the reactor. The heat and hot gas is distributed uniformly upward, heating and drying the down-flowing waste feed and enabling the pyrolysis and gasification processes to occur efficiently. The uniform heat distribution upward and the presence of the carbon catalysis bed also avoids channeling of the heat, which in turn prevents the bridging of the waste feed, which is a typical problem encountered in other thermal waste treatment processes.

The reactor's funnel shape and the rising gas feed rate (from the torches and other gas inlets) are designed to ensure minimum superficial velocity of the rising hot gases. This low superficial velocity allows the entering waste feed to descend into the waste bed completely and not be forced upward into the exiting gas as unprocessed waste or particulate carryover. Additionally, the cracking zone 16 of the reactor serves to ensure that all hydrocarbon materials are exposed to the high temperature with residence time in excess of 2–3 seconds prior to exiting the reactor. This zone completes the thermal cracking process and assures complete gasification and conversion of higher hydrocarbons to CO and $H_2$.

As the cold waste feeds 58 are continuously fed into the plasma reactor and form a bed of waste 70 on top of a previously heated bed of consumable carbon catalyst 60 in the bottom of the reactor, the descending cold waste and the rising heated gas from the consumable carbon catalyst bed 60 create a counter-current flow that allows the complete gasification/pyrolysis of the hydrocarbon material uniformly across the reactor.

The consumable carbon catalyst bed 60 applied and used in this process is not unlike that used in typical metallurgical blast furnaces, and its inclusion into the gasification process serves at least the following several functions: (1) it initiates the gasification reaction by providing the key component of the exit gas, i.e., the CO (carbon monoxide) contributing to the heating value of the exit top gas; (2) it allows for the distribution of the plasma-generated heat uniformly across the plasma reactor and thus prevents the excessive wear and tear in the refractory that is normally encountered when intense focal heat sources such as plasma torches are utilized; (3) it provides a porous but solid support framework at the bottom of the reactor upon which the waste bed can be deposited; (4) it allows the hot gases along with hot carbon particles to move upward into and through the waste bed uniformly, while allowing the inorganic material in the waste such as metal and ash to be melted and to flow downward into the molten pool at the bottom of the reactor; and (5) it provides a layer of protection inside the innermost refractory layer and thus decreases heat loss in the reactor while extending the refractory life.

The bed 60 of carbon catalyst is constantly consumed at a slower rate than is the waste bed 70 due to its higher density of fixed carbon atoms, higher melting temperature, and hard physical properties. The height of the consumable carbon catalyst bed, like the waste bed, is monitored constantly via temperature and pressure sensors located circumferentially around the reactor and at various elevations along the shaft. As waste bed 70 and carbon catalyst bed 60 are consumed during the process, the sensors will detect a temperature and pressure gradient across the reactor and automatically trigger the feeding system to increase or decrease the bed height in a steady-state operation.

The interaction of a carbon catalysis bed and molten material is a well-understood phenomenon. In the case of molten metal flowing over hot coke, as in the case of foundry cupola melters, the molten iron does not stick to the hot bed but flows over it. The same phenomenon is observed during the melting of non-metallic material, i.e., vitrification of slag. Unlike metal melting, slag vitrification does not involve dissolution of carbon since the solubility of carbon from the coke into the molten slag is negligible.

As described in the Camacho Patents, the hydrocarbon portion of the waste will be pyrolyized/gasified under the partially reducing atmosphere of the reactor in an air/$O_2$-deprived (with respect to complete oxidation of carbon to $CO_2$) environment Therefore, there is no combustion process occurring in the reactor to produce the pollutants normally expected from incinerators, such as semi-volatile organic compounds SVOCs, dioxins, and furans, which are essentially partially combusted materials. In the Camacho Patents, the hydrocarbon material was described as undergoing the following chemical reaction:

$$C_xH_y+H_2O=CO+CO_2+H_2 \quad (1),$$ 

where $C_xH_y$ represents an arbitrary hydrocarbon, and the $H_2O$ component indicates recycled steam.

Although the "steam gasification" process as depicted in the above formula (1) continues to constitute a major chemical reaction within the plasma pyrolysis/gasification vitrification process, recent operating experience has indicated that the energy consumed in this endothermic reaction is undesirably high. As the ultimate goal of the PPGV process is to produce net electrical energy from the waste material, certain improvements and modifications are made to optimize the chemical reaction inside the reactor in order to decrease plasma torch power consumption and thus increase net energy production. To this end, a controlled amount of air, $O_2$ and/or $O_2$-enriched air is added into the reactor through the inlets 39 and 41 located in zone 18 of the reactor 10 to promote the following reactions:

$$C_xH_y+O_2=2CO+H_2 \quad (2)$$ 

$$2C+O_2=2CO \quad (3)$$ 

$$C+H_2O=CO+H_2 \quad (4)$$ 

Reactions 2 and 3 are exothermic, whereas reactions 1 and 4 are endothermic in nature, thus allowing the inherent energy of the waste through this controlled oxidative reaction to increase the heating value of the exit top gas by generating more CO and $H_2$, and to reduce plasma torch power consumption for reactions (1) and (4), i.e., breaking the $H_2O$ bond with the cumulative result of increased net power production.

The reaction in formula (1) will continue to occur in the reactor with the $H_2O$ component normally found in the waste feed. This $H_2O$ bond will be naturally broken as a result of the rising hot gas through the waste bed into 2H and O, whereby they will combine with the free C molecule from the waste and the consumable carbon catalyst to form the highly stable (and desired) CO and $H_2$.

The controlled input of the $O_2$-enriched air introduces sufficient $O_2$ into the reactor to generate the oxidative reactions (2) and (3) above but not enough $O_2$ to create the complete oxidative combustion reaction $$C_xH_y+O_2=CO_2+H_2O \quad (5),$$ 

which occurs at the much lower temperature of incineration process.

The controlled introduction of oxygen-enriched air into the plasma reactor to generate a controlled partial oxidation reaction of gasification will generate an exit top gas with higher calorific content while reducing the specific energy requirement, that is, the energy consumed by the plasma torches to gasify the waste. This in turn results in a higher net energy production from the gasification of organic waste. This is counter to the teachings of the Camacho Patents, which discussed that a greater quantity of an oxygen-containing plasma gas does not yield proportional increases in input power-to-heat efficiency of the system. At the temperatures in the reactor in the presence of solid carbon from the catalysis bed, the following reaction (6) is shifted entirely to the left, making CO the dominant carbon oxide species present:

$$CO+\tfrac{1}{2}O_2=CO_2 \quad (6).$$ 

The controlled process of gasification with both introduced oxygen, air and inherent moisture of the waste can produce an exit top gas with a minimum HHV of 3600 Kg/KG (a composition of gas containing at least 40–45% $H_2$ and 40–45% CO). (The remaining gas components are typically $CO_2$, $CH_4$, $N_2$, and traces of acid gases, depending on the feed stock composition.)

As noted above and in the Camacho Patents, a major portion of the output from the process of this invention is in the form of gas, the balance being molten inorganic material, which cools to a vitrified inert slag.

The waste bed 70 is continuously consumed by the rising hot gases from the consumable carbon catalyst bed and continuously replenished by the feeding system in order to maintain the bed height. (Additional carbon catalyst is also provided periodically through the feed chutes when in need of replenishment.) This sequence results in a temperature gradient from up to 4000–5000° C. at the bottom of the reactor to about 1200° C. in the exit gas outlet. The rising counter-current system thus established serves to dry the incoming waste and thus allow the system to handle a waste stream with moisture content of up to 90% without a proportional increase in energy consumption requirements.

Figure 4:
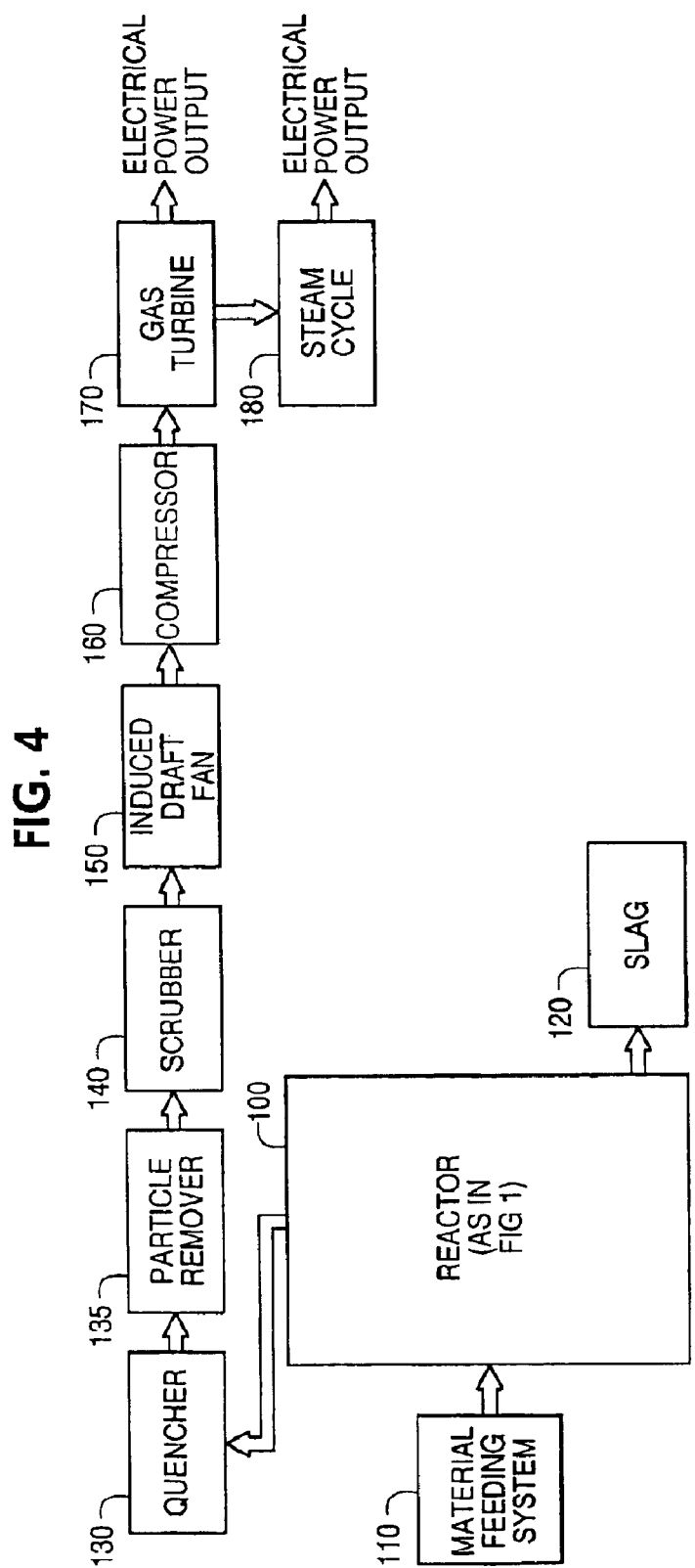
FIG. 4 is a schematic representation of an energy production process according to an embodiment of the present invention.

The reactor operates at slightly below atmospheric pressure, and the exit gases are constantly extracted out of the reactor by an induction fan (ID fan) 150 located between a syn-gas scrubber system 140 and a compressor 160, as shown in FIG. 4. As mentioned previously, the reactor conditions are reducing in nature, with mostly starved or deprived oxygen conditions suitable for the gasification process.

The independent control variables of the process are (1) the waste feed rate, (2) the consumable carbon catalyst bed height, (3) the torch power, (4) the air/$O_2$ gas flow, and (5) the flux input (to control the slagging process).

The molten, inorganic pool at the bottom of reactor 10 is tapped continuously out of the reactor via slag tap 44 into a refractory-lined funnel connected to an enclosed water-filled drag chain conveyor (not shown). The molten mass will cool and solidify into glassy granules, which are transported to a mobile bin (also not shown) by the drag chain conveyor. Steam produced when the hot slag is quenched in the conveyor may be vented to the plasma reactor and consumed in the steam gasification reaction. Alternatively, the slag can be cast into large blocks to maximize volume reduction.

To ensure that the slag flow is uniformly constant and to prevent plugging of the slag tap hole 44, the temperature of the slag as reflected in the temperature of the reactor bottom thermocouple system as well as the slag viscosity may be independently controlled by the plasma torch power and the amount of flux (CaO+Silicate) added via the feed chutes, respectively, through known relations. The flow of the molten material is also monitored closely by a flow meter (not shown) located at the bottom of the reactor.

All these monitored parameters regarding the temperature, pressure, gas composition, and flow rates of gas and molten material are fed as inputs into a computerized DCS system, which in turn is matched to process controls of the independent variables such as torch power, air/gas flow, waste and catalyst feed rates, etc.

Depending on the previously analyzed waste feed, specific gasification and vitrification conditions are predetermined and parameters pre-set by the DCS control system. Additional and optimizing conditions will be generated and adjusted during start-up of operation when actual waste materials are fed into the system.

Operating Principles

In general, the plasma pyrolysis-gasification-vitrification apparatus and process described herein functions and operates according to several main principles.

Variations in the waste feed will affect the outcome of the process and will require adjustment in the independent control variables. For example, assuming a constant material feed rate, a higher moisture content of the waste feed will lower the exit top gas temperature; the plasma torch power must be increased to increase the exit gas temperature to the set point value. Also, a lower hydrocarbon content of the waste will result in reduction of the CO and $H_2$ content of the exit gas resulting lower HHV of the exit top gas; the enrichment factor of the inlet gas and/or plasma torch power must be increased to achieve the desired HHV set point. In addition, a higher inorganic content of the waste will result in an increase in the amount of slag produced resulting in increased slag flow and decreased temperature in the molten slag; the torch power must be increased for the slag temperature to be at its target set point. Thus, by adjusting various independent variables, the reactor can accommodate variation in the incoming material feed while maintaining the desired set points for the various control factors.

Start-up

Figure 3:
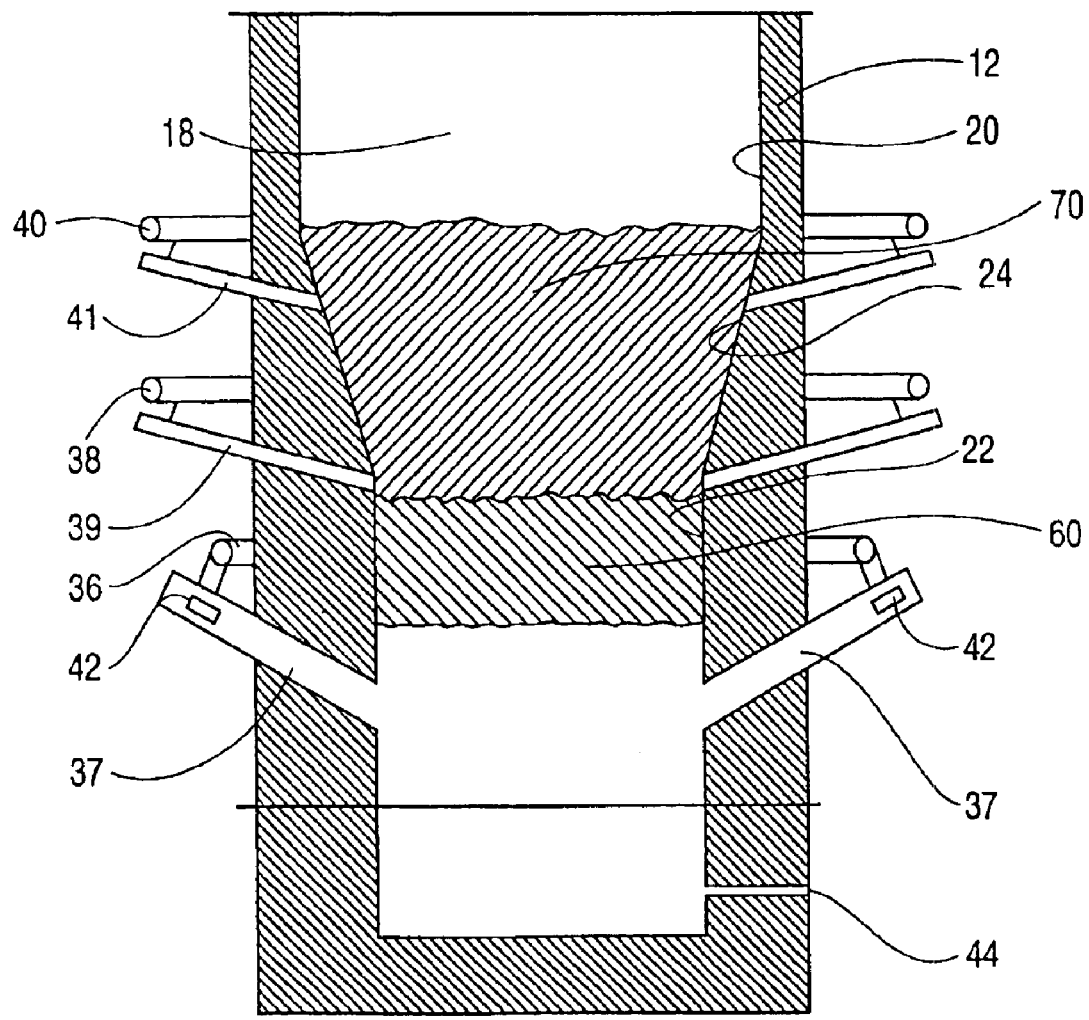
FIG. 3 is an enlarged view of the lower section of the reactor in FIG. 2 with a consumable carbon catalyst bed and a waste bed.

The goal of a defined start-up procedure is to create a gradual heat up of the plasma reactor to protect and extend the life of the refractory and the equipment of the reactor, as well as to prepare the reactor to receive the waste feed material. Start-up of the reactor is similar to that of any complex high-temperature processing system and would be evident to anyone in the thermal processing industry. The main steps are: (1) start the gas turbine on natural gas to generate electricity; (2) start the gas clean-up system with the induced draft fan started first; and (3) heat up the reactor slowly by using the minimal power available in the plasma torches (this is done primarily to maximize the lifetime of the refractory material by minimizing thermal shock). The consumable carbon catalyst bed 60 is then created by adding the material such that a bed is formed. The bed will initially start to form at the bottom of the reactor, but as that initial catalyst, which is closest to the torches, is consumed, the bed will eventually be formed as a layer above the plasma torches at or near the frustoconical portion 24 of the reactor, as shown in FIG. 3.

Waste or other feed materials can then be added. For safety reasons, the preferred mode of operation is to limit the water content of the waste to less than 5% until a suitable waste bed 70 is formed. The height of both the consumable carbon catalyst bed and the operating waste bed depends upon the size of the reactor, the physio-chemical properties of the feed material, operating set points, and the desired processing rate. However, as noted, the preferred embodiment maintains the consumable carbon catalyst bed above the level of the plasma torch inlets.

Steady-state Operation

When both the waste bed and the carbon catalyst bed reached the desired height, the system is deemed ready for steady operation. At this time, the operator can begin loading the mixed waste feed from the plant into the feeding system, which is set at a pre-determined throughput rate. The independent variables are also set at levels based on the composition of the waste feed as pre-determined. The independent variables in the operation of the PPGV reactor are typically:

A. Plasma Torch Power
B. Gas Flow Rate
C. Gas Flow Distribution
D. Bed Height of the Waste and Carbon Catalyst
E. Feed Rate of the Waste
F. Feed Rate of the Carbon Catalyst
G. Flux Feed Rate During the steady state, the operator will monitor the dependent parameters of the system, which include:

A. Exit Top Gas Temperature (measured at exit gas outlet)
B. Exit Top Gas Composition and Flow Rate (measured by gas sampling and flow meter at outlet described above)
C. Slag Melt Temperature and Flow Rate
D. Exit Top Gas Heating Value
E. Slag Leachability
F. Slag Viscosity During operation and based on the above described principles, the operator may adjust the independent variables based upon fluctuations of the dependent variables. This process can be completely automated with pre-set adjustments based on inputs and outputs of the control monitors of the reactor programmed into the DCS system of the plasma reactor and the whole plant. The pre-set levels are normally optimized during the plant commissioning period when the actual waste feed is loaded into the systems and the resultant exit top gas and slag behavior are measured and recorded. The DCS will be set to operate under steady state to produce the specific exit gas conditions and slag conditions at specified waste feed rates. Variations in feed waste composition will result in variations of the monitored dependent parameters, and the DCS and/or operator will make the corresponding adjustments in the independent variables to maintain steady state.

Cooling and Scrubbing of the Exit Top Gas from the Plasma Reactor

As mentioned above, one objective for the operation of the PPGV reactor system is to produce a fuel gas with specific conditions (i.e., composition, calorific heating value, purity and pressure) suitable for feeding into a gas turbine for production of renewable electrical energy.

Because the fuel is generated by the pyrolysis/gasification of organic waste material through the process described herein, there will exist certain amounts of waste impurities, particulates and/or acid gases which are not suitable to the normal and safe operation of the gas turbines. A very simplified procedure to clean the exit gas was described in the Camacho Patents. A more detailed and specific procedure is now presented.

First, under the vacuum extraction condition of the ID fan 150, the hot exit gas is continuously withdrawn from the reactor through the exit gas outlet(s) 30 of the reactor. This gas needs to be cooled and cleaned before entering the compressor and gas turbine.

As shown in FIG. 4, the syn-gas from the plasma reactor 100 is first cooled down by direct water evaporation in an evaporator such as quencher 130. This is simple, reliable and cost effective. In case there are dust particles escaping the reactor, they will be removed from the gas by an electro filter 135, which is known as an efficient and reliable way to separate dust. Alternative embodiments may utilize other standard particulate removal devices (such as a venturi scrubber or fabric filter baghouse), which are well known to practitioners of gas clean-up. Also, alternative embodiments may change the order of the various gas clean-up steps to use more efficiently the characteristics of alternative gas cleaning devices. The dust is then collected and may be sent back to the plasma reactor so that no hazardous, solid wastes are produced or generated in the gas clean-up system. Alternatively, a slag pot, a refractory-lined metal/steel casing which also houses a non-transferred plasma arc torch, may be used to vitrify the scrubber solids into a non-leachable slag. In some cases, depending upon plant considerations and local regulations, solids from the gas clean-up system may be sent off-site for safe disposal.

The syn-gas is then treated in two steps: first, components such as chlorine are removed in a gas/liquid scrubber-contactor 140 with high efficiency. The washing liquid is recycled back to the first cooling section: again, no wastes are produced in this step, and water consumption is limited to the minimum possible. Soda may be used in this first step.

For waste that contains a high amount of sulphur, a syn-gas high in sulfur may be created. A second-stage liquid washing process is used to remove sulphur compounds from the syn-gas. Elemental sulphur is the only residue recovered from the process, and this sulphur may be used as fertilizer. The washing liquid is recycled back to the process after regeneration: no liquid wastes are produced during this step. This process is well proven and very efficient, allowing treated syn-gas to be further sent to the compressor/turbine.

Compression and Feeding of Fuel Gas

The syn-gas produced from the waste feedstock will be the normal fuel for a conventional combined cycle power plant. However, the power plant must be started up with natural gas, and then switched to the syn-gas. The fuel gas must be pressurized in order to feed the gas turbine in the combined cycle plant.

The syn-gas enters a compressor 160 and is compressed to about 36 bars. The syn-gas heats up as it is compressed. The hot, pressurized syn-gas is cooled between compressor stages, and then after the final stage, the remaining water in the gas is condensed, improving the heating value of the gas. Water condensed from the syn-gas is collected in a moisture separator and recycled for use in the gasification plant. After the last stage, the cooling is accomplished partially in a recuperator, which transfers heat from the wet syn-gas to the dry syn-gas. The final cooling is done in a cooling water heat exchanger.

The recuperator is used because the additional sensible heat in the syn-gas improves the efficiency of the combined cycle power plant, while minimizing the cooling water system load. The heating is also required to keep the fuel gas well above the dew point in order to ensure proper operation of the gas turbine fuel system and controls.

Before entering the gas turbine fuel skid 170, the pressurized, dry syn-gas is filtered to collect any trace quantities of particulate matter that may have been picked up in the processing equipment and piping.

Natural gas from the local pipeline is boosted up in pressure to 34 bar using a reciprocating compressor. The natural gas then flows through a standard filter/separator to remove any traces of water droplets or solids before being sent to the gas turbine fuel skid.

The combined cycle gas turbine produces electricity from the fuel gas generated by the plasma reactor. Approximately 25% of the electricity generated will be utilized by the plant's equipment, such as the plasma torches, plasma reactor, compressor, and miscellaneous equipment such as pumps, and thus provide for a self-sufficient system. The extra net amount of electricity is then sold to the local utility grid as revenues for the plant.

Energy Production Considerations

As described in the Camacho Patents, the heat energy recovery consists of (1) sensible heat and (2) calorific heat. The invention described herein clarifies that the total heat recovered is the sum of the heat content of the waste, the heat energy content of the carbon catalyst and the $O_2$ and air introduced into the system, and the heat energy from the plasma heating system, less the heat loss from the reactor.

Figure 5:
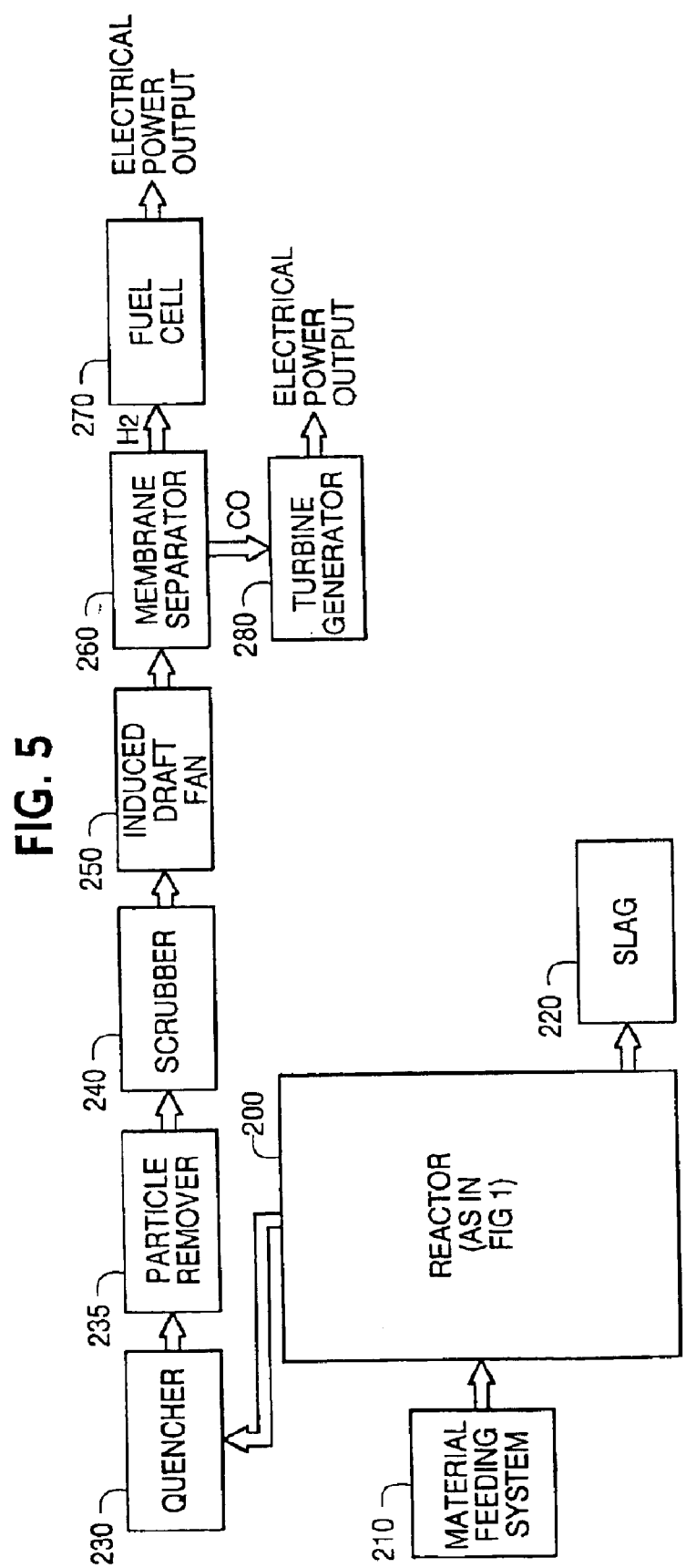
FIG. 5 is a schematic representation of an energy production process according to a second embodiment of the present invention.

Furthermore, talking into account that the fuel gas must be cleaned and compressed with each of these stages requiring some energy consumption, the total energy recovery of the complete PPGV energy plant utilizing a combined cycle turbine has between 36%–40% thermal efficiency. However, the syn-gas generated by the PPGV process contains on average 45–55% $H_2$ gas. After cleaning and cooling (as described in this document) the $H_2$ may be separated from the syn-gas via a number of commercially available technologies. The preferred embodiment uses commercially available membrane technology such as membrane separator 260, as shown in FIG. 5. The clean $H_2$ gas, thus separated, can be stored and transported off-site for sale. Alternatively, the $H_2$ can be fed directly into a fuel cell system 270 to generate electricity and water on-site, pending the development of suitable commercially available stationary fuel cells. The syn-gas (rich in CO) remaining after H2 separation can be used to generate additional electricity through a turbine generator 280 or other gas-fired engine via conventional heat engine technology.

The efficiency of the system will vary according to the equipment utilized, the process applied, and the operator's skill and experience. This invention describes an improved pyrolysis and gasification process in a plasma reactor resulting in substantial reduction in the plasma heat energy consumed per ton of waste treated. The previous Camacho Patents disclosed an energy per ton level of 500 kwh/ton for MSW-type waste; the current invention when practiced in accordance with various of its aspects requires only 150 kwh/ton, a 350 kwh/ton reduction.

As described herein, the improved feeding system, the improved plasma pyrolysis and gasification and vitrification process with specific and defined operating control system, the improved gas cooling and cleaning process and the detailed defined feeding of this gas into a ICG power production system provides a more effective means of recovery of the heat energy of the waste, biomass or other feed material in the form of renewable electric energy and a self-sufficient waste disposal method whereby the energy produced by the process is at the minimum four times the energy consumed. The actual ratio of gross energy required to net energy produced depends upon a number of factors, including feed composition, plant configuration, and operating practice. This invention also provides an environmentally safe process to neutralize the hazardous components of waste into a stable inert vitrified slag material and eliminates the continuous movement of waste from one form to another through land filling and incineration.

While the invention has been described with reference to specific embodiments thereof, it will be appreciated that numerous variations, modifications, and embodiments are possible and accordingly, all such variations, modifications and embodiments are to be regarded as being within the spirit of this invention, as defined by the following claims:

We claim:

1. An apparatus for plasma pyrolysis, gasification and vitrification of material comprising:
    a generally funnel-shaped reactor having an upper section and a lower section, said lower section comprising a first, wider portion connected by a frustoconical transition to a second, narrower portion, and being suitable to receive a carbon catalyst bed, and said upper section having at least one gas exhaust port and being constructed to receive said material from a plurality of directions with respect to said lower section;
    a gas inlet system disposed around said lower section to provide gas into said lower section through one or more intake ports in said lower section; and
    a plurality of plasma arc torches mounted in said lower section to heat said carbon catalyst bed and said material.

2. An apparatus according to claim 1 wherein said upper section has a plurality of intake ports.

3. An apparatus according to claim 2, further comprising:
    a material delivery system to provide said material to said reactor through said plurality of intake ports, said delivery system comprising:
        a receptacle to receive said material, a shredding and compacting unit disposed to accept said material from said receptacle and to shred and compact said material, and a transfer unit to deliver said shredded and compacted material to said reactor.

4. An apparatus according to claim 3 wherein said material comprises carbonaceous material.

5. An apparatus according to claim 4 wherein said carbonaceous material comprises waste.

6. An apparatus according to claim 5 wherein said carbon catalyst bed is about 1 meter in height.

7. An apparatus according to claim 3 further comprising a plurality of sensors disposed throughout said reactor to sense one or more of: a height of said carbon catalyst bed, a height of a bed of said material, a temperature of said reactor, a flow rate of gas in said reactor, and a temperature of a gas exhausted from said reactor through said exhaust port.

8. An apparatus according to claim 1 wherein said lower section has one or more tap holes at a bottom thereof.

9. An apparatus for the production of electrical energy comprising the apparatus according to claim 1 and further comprising:
    an evaporator connected to said exhaust port for removing water from a gas exhausted from said exhaust port;
    a scrubber connected to an output of said evaporator for cleaning said gas;
    a compressor connected to an output of said scrubber for compressing said gas; and
    a gas turbine connected to an output of said compressor for producing electricity from said compressed gas.

10. A method for the conversion of material comprising waste, biomass or other carbonaceous material by plasma pyrolysis, gasification and vitrification, said method comprising:
    providing a carbon catalyst bed in a lower section of a reactor;
    providing one or more successive quantities of said material from a plurality of directions into an upper section of a reactor, said upper section having at least one gas exhaust port connected to a fan, said material forming a bed atop said carbon catalyst bed;
    heating said carbon catalyst bed and said material bed using a plurality of plasma arc torches mounted in said lower section; and
    introducing into said lower section a predetermined amount of oxygen or oxygen-enriched air.

11. A method of producing electrical energy from waste comprising the method of claim 10 and further comprising:
    evaporating the gas exhausted from said gas exhaust port;
    scrubbing said gas;
    compressing said scrubbed gas; and
    supplying said compressed gas to fuel a gas turbine to generate electrical energy.

12. A method of producing electrical energy from waste comprising the method of claim 10 and further comprising:
    evaporating the gas exhausted from said gas exhaust port;
    scrubbing said gas;
    compressing said scrubbed gas;
    powering a fuel cell using said hydrogen component; and
    supplying a remainder of said compressed gas, after said hydrogen component is separated, to fuel a gas turbine to generate electrical energy.

* * * * *